United States Patent [19]
Hofmann

[11] Patent Number: 5,809,076
[45] Date of Patent: Sep. 15, 1998

[54] METHOD FOR AUTOMATICALLY INDEPENDENTLY PROVIDING ASYNCHRONOUS BROUTER ADDRESS INFORMATION TO REMOTE CONTROL UNITS

[75] Inventor: Judson A. Hofmann, Mendham, N.J.

[73] Assignee: Panasonic Technologies, Inc., Princeton, N.J.

[21] Appl. No.: 40,472

[22] Filed: Mar. 31, 1993

[51] Int. Cl.[6] .............................. H04B 3/00; H04L 12/28
[52] U.S. Cl. ...................... 375/257; 370/384; 370/401; 370/410; 370/911
[58] Field of Search ..................... 370/384, 401, 370/410, 428, 908, 911, 913, 245; 340/825.22, 825.24, 825.25, 825.69, 825.72, 310.01, 310.06; 455/517, 518, 507, 32.1; 375/257; H04L 12/28

[56] References Cited

U.S. PATENT DOCUMENTS

| | | | |
|---|---|---|---|
| 4,833,702 | 5/1989 | Shitara et al. | 379/60 |
| 5,062,151 | 10/1991 | Shipley | 359/154 |
| 5,068,916 | 11/1991 | Harrison | 375/107 |
| 5,088,090 | 2/1992 | Yacoby | 370/85.13 |
| 5,159,592 | 10/1992 | Perkins | 370/85.7 |
| 5,214,646 | 5/1993 | Yacoby | 370/85.14 |
| 5,251,205 | 10/1993 | Callon | 370/60 |
| 5,276,680 | 1/1994 | Messenger | 455/38.3 |
| 5,345,500 | 9/1994 | Breeden et al. | 379/63 |
| 5,452,291 | 9/1995 | Eisenhandler | 370/54 |

OTHER PUBLICATIONS

George Hanover, Networking The Intelligent Home, IEEE Spectrum Oct. 1989, pp. 48–49.

Hargarden, Paul J. et al, Functions & Operations of Cebus Routers, May 1991.

*Primary Examiner*—Edward L. Coles
*Assistant Examiner*—Madeleine Av Nguyen
*Attorney, Agent, or Firm*—Amster, Rothstein & Ebenstein

[57] ABSTRACT

A network configuration communication system and method comprising at least one brouter for automatically broadcasting its address and other network configuration information and at least one remote control device for receiving brouter broadcasts and automatically updating its network configuration storage locations. The remote control device may also be equipped to send requests for information for automatically transmitted response by proximate network brouters.

16 Claims, 2 Drawing Sheets

METHOD FOR AUTOMATICALLY INDEPENDENTLY PROVIDING ASYNCHRONOUS BROUTER ADDRESS INFORMATION TO REMOTE CONTROL UNITS

FIELD OF THE INVENTION

The present invention relates to the networking of electronic equipment in local area networks (LAN's). More particularly, it relates to the use of a remote control unit for operating networked consumer products.

BACKGROUND OF THE INVENTION

Networking of electronic equipment in a locale by local area networks has become increasingly desirable. Various interconnection schemes have been devised to effect the networking of electronic equipment and to facilitate communications along such networks. One interconnection system, known as Consumer Electronic Bus (CEBus), has been developed particularly for use in interconnecting household consumer products. The CEBus Standard, E.I.A. IS-60, has been developed by participants in the United States electronics industry to facilitate the interconnection of various classes of electronic consumer products, including audio and audio-visual (AV) products, in the home. The CEBus standard defines methods of networking electronic consumer products, or units, via any of the five commonly used media including: power line (PLBus), coaxial cable (CXBus), twisted pair (TPBus), infrared light (IRBus) and low power radio frequency (RFBus), the latter two media being particularly significant in the wireless remote control applications of the technology. Interconnected units can be accessed and can communicate along a control channel associated with each of the media. The control channel is generally a small amount of spectrum space, or bandwidth, in the connecting media which is devoted to network communications.

Communication over the control channels in the CEBus network is by a particular digital communication method which is defined in the aforementioned CEBus Standard. Each unit monitors the control channel for the digital communications directed to that unit. Ideally, and in accordance with the Standard, each unit in the network is assigned a unique address. A digital communication message is incorporated into a packet including a destination address, having the address of the unit for which the message is intended, the source address of the unit sending the message and the message itself. The standard packet, in simplified form, has the following structure:

<destination address><source address><message>.

If a message is intended for all of the units on the network, a broadcast address is inserted as the <destination address> for the packet. Packets may emanate from any of the units equipped with the appropriate circuitry for assembling and disseminating a packet, but can be generated by the CEBus network systems controller (if one is included in the system), a local user control operation (such as the user operating a switch at a stereo receiver), or a remote user control operation via a remote control device associated with the network.

The CEBus Standard additionally defines a method of transferring the packets from the control channel of one medium to the control channel of another media in the network, as illustrated in FIG. 1. The devices which are responsible for packet transfer are either routers, 10, or brouters, 11 and 17, which are positioned at fixed locations in the CEBus network. By definition, a router transfers control channel packets from one wired medium to another wired medium, for example router 10 which connects node 12 on twisted pair bus 14 to node 16 on coaxial cable bus 18. A brouter, on the other hand, transfers packets from a wireless medium to a wired medium, such as brouter 11 in FIG. 1 which transfers packets from RFBus 13 to node 12 along the twisted pair bus, or brouter 17 which transfers packets from IRBus 19 to node 16 along the coaxial cable bus.

Routers and brouters may be independent components in the network, remotely connected to the units, or may be associated with, and included in, a unit, by so-called local connection. However, it is the brouters in a network which will receive all messages from an associated wireless remote control device and transfer the messages onto the medium to which the designated unit is connected, directly to the unit when the destination is a local brouter-unit pair or through the connecting network media when a remote unit is designated.

Electronic units including wireless remote control devices and other electronic components adapted for wireless communication through the network must have, in their memory, the address of each destination unit connected to the network. These addresses can be provided to the electronic unit at initialization, for example, to the remote control device according to the programming instructions for same. Generally, during programming of a remote control device, a button on a keypad can be assigned to an individual destination unit for ease of consumer use, similar to the assignment of functions such as volume control to individual designated buttons. Once programmed, the address of the individual destination unit will be automatically generated every time the designated button is depressed. In order to access the destination unit, the wireless remote control device must create a packet which includes, in addition to the destination unit's address, the address of the brouter through which the packet must pass. The brouter address and the destination addresses are generally stored in separate memory locations in the remote control device. The remote control device may also have additional network configuration information stored in its memory.

When addressing a local destination unit which has a local brouter or other IRBus node resident in the destination unit, the destination unit is addressed directly, with the brouter having the same address as the destination unit itself, and without a need for the network layer of the address packet to be accessed. For addressing a packet to a remote destination unit, however, the packet generated by the remote control device must include the separate address of the associated network brouter along with the destination unit's address, and may additionally include complete network configuration routing information.

Brouters and routers maintain one or more storage locations containing the addresses of some or all of the destination units to which they are connected. These tables are created by the sequential entry of addresses to an allocated location in memory as network packets pass through the brouter or router. The tables are continuously updated by the network traffic through the brouter or router. In addition, the addresses may be supplied to the brouter or router by the network controller, if one is included in the network.

In use, wireless remote control devices can be carried from one part of the network (e.g., one room) to another. Similarly, a new brouter can be substituted for an existing brouter in the network. In these situations, the remote brouter address to which packets are directed will not be recognized by the new proximate brouter (unless the remote control device and the brouter have been moved as a pair). Consequently, each time the network is reconfigured, the user must update the addressing information stored in the remote control device to ensure that the appropriate network routing and proximate brouter addressing information will be available to the remote control device.

Such a requirement is inherently "user-unfriendly" since it requires a level of involvement not desired by most users. Moreover, since brouters are not ordinarily separate units from the user's perspective, the user will generally not be aware of the brouter or its address for use in reprogramming the remote control, nor of the paths among and between network units through which packets are to be routed.

What is needed is a system which facilitates the reconfiguration of a local area network, for example a consumer electronics CEBus network, controlled in part by an electronic unit such as a remote control device. That is accomplished in accordance with the present invention by automatically providing updated brouter and/or router address information to the electronic unit.

It is therefore an objective of the present invention to provide a remotely controllable network system which does not require continual reprogramming by the user.

It is yet another more specific objective of the present invention to provide, in a local area network interconnecting electronic units, brouters and routers which automatically update the address tables of an electronic unit such as a remote control device for use therewith.

Still another objective of the invention is to provide brouters and routers adapted to broadcast their addresses continually.

Yet another objective of the present invention is to provide electronic units such as a remote control device which can be automatically updated with router, brouter and network information.

SUMMARY OF THE INVENTION

These and other objectives are realized by the invention wherein network brouters and/or routers automatically periodically broadcast their addresses to thereby effect updating of the addressing information stored in electronic units adapted for use therewith in the vicinity thereof. The brouters or routers may additionally provide network address and configuration information to the electronic units in this manner. The electronic units, such as remote control devices are adapted to receive the broadcast information and automatically update the memory locations in which the information is stored. In a further embodiment of the invention, the brouter or router provides the address information automatically in response to a request from the electronic unit, rather than at preset intervals.

BRIEF DESCRIPTION OF THE DRAWINGS

The present invention will now be further described with specific reference to the accompanying drawings wherein.

DETAILED DESCRIPTION OF THE PREFERRED EMBODIMENT

Figure 1:
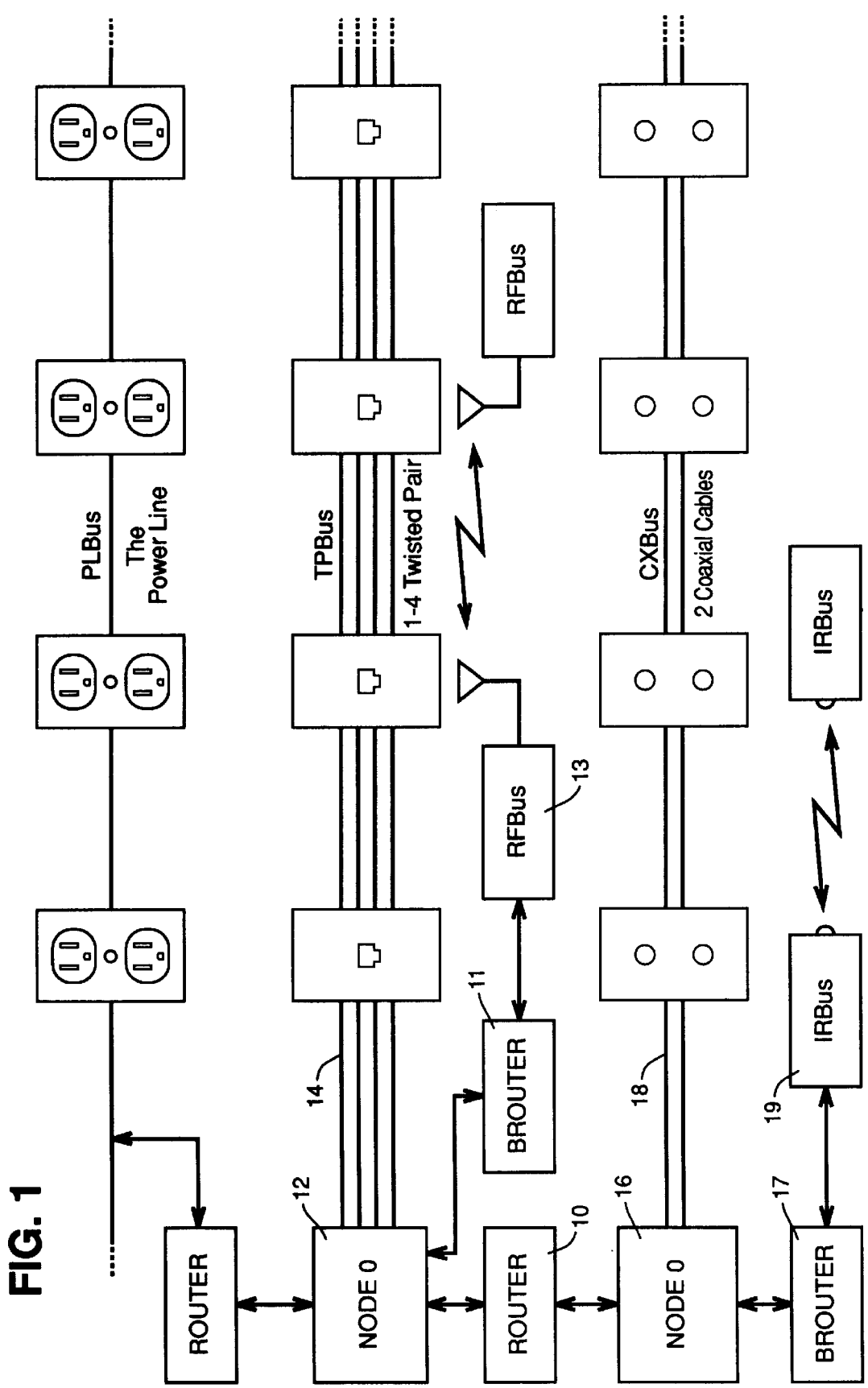
FIG. 1 is a schematic diagram of a CEBus network for use in a home.

The present invention will, for illustrative purposes, be described in further detail with specific reference to a CEBus network of consumer electronic equipment in a home environment. The invention is applicable to all local area networks developed for interconnection of electronic equipment and is not intended to be limited to the specific CEBus embodiment. Further, the operation of brouter-remote control device pairs will be described, which description should be read broadly to encompass the corresponding equipment such as routers corresponding to brouters, and other electronic units adapted for wireless communication corresponding to the remote control device. The application of the invention to the corresponding network components will become apparent to one skilled in the art from the following detailed description.

In accordance with the present invention, the brouters which are employed in a local area network, and specifically a CEBus network, are bidirectional. In a first embodiment, each network brouter will periodically automatically broadcast its address over the IRBus and/or RFBus and on the wired medium to which it is also connected. A remote control device or other electronic unit in the vicinity will receive this broadcast information and automatically update its proximate brouter address storage location to contain the address of the proximate brouter for inclusion in all network communication packets which it generates. Necessarily, a remote control device adapted for use with the present invention will be equipped with at least one readable/writable memory location for storage of the proximate network brouter address. The remote control device would also have, at a minimum, its own address and the broadcast address used by the network in one or more memory locations. As discussed above, the remote control device will generally have destination unit addresses in storage locations, as well. After the proximate brouter address packet has been received and the corresponding memory location updated, each packet created by the remote control device will have the appropriate bits set to the proximate brouter address and the other destination information (e.g., unit address), source information and message, appended thereto.

As is known in the relevant art, brouters and remote control devices are "intelligent" devices having central processing units (CPU's) associated therewith. The assembling of packets is controlled by software resident in the CPU in accordance with known technology. What is new to the present invention is a system wherein the brouters and remote control devices are programmed to transmit and receive the addressing and/or system configuration and routing information automatically, as will be further detailed hereinafter.

Relocation of the remote control unit or network brouter will, however, affect the capability of the remote control device to access remote units in the network. As discussed above, packets assembled with network flags set and directed to a particular network brouter address by the remote control unit will not be received by any other network brouter upon relocation of either the brouter or the remote control device. As discussed above, updating of the network brouter address has, in the past, required reprogramming of the remote control device. In accordance with the first embodiment of the invention, bidirectional brouters are incorporated into the network and are equipped to broadcast their addresses along the wireless media, IRBus or RFBus or both, to any proximate remote control device. Broadcasting of the address along the wired media may be conducted also, simultaneously or independently of the wireless transmission. The remote control device, in accordance with the present invention is also bidirectional and is designed to receive the proximate brouter's broadcast packet and automatically update the storage location at which the network brouter address is stored and from which it is automatically accessed when the remote control device assembles a packet. The brouter may broadcast not only its address, but also the entire contents of its address tables in this manner. The inventive system, therefore, allows the user to be oblivious to both the need for and the updating of the remote control device.

From a practical standpoint, the additional IRBus or RFBus traffic introduced by the periodic brouter broadcasts is negligible for broadcasts generated at, for example, one/ second intervals. If there is a concern about the continuous introduction of IR or RF signals in the room, an alternative embodiment can be implemented wherein the brouter address is provided to the remote control device upon demand. The user activates an on-off switch or a button on the remote control device which will cause the remote control device to "query" the proximate brouter for its address. An IR or RF broadcast packet from the remote control device to a proximate brouter will request that the brouter automatically broadcast its address in response to the request. The remote control device will then receive the brouter's broadcast and update its brouter address storage location as above. Activation of the query function may also be done automatically upon the user's depression of any button on the remote control; this latter method is advantageous in that the user does not have to be aware of the activation, yet disadvantageous in that every use of the remote control device would then require an initial query-and-update function prior to every transmission of remote control generated packets and execution of the intended commands or messages.

Figure 2:
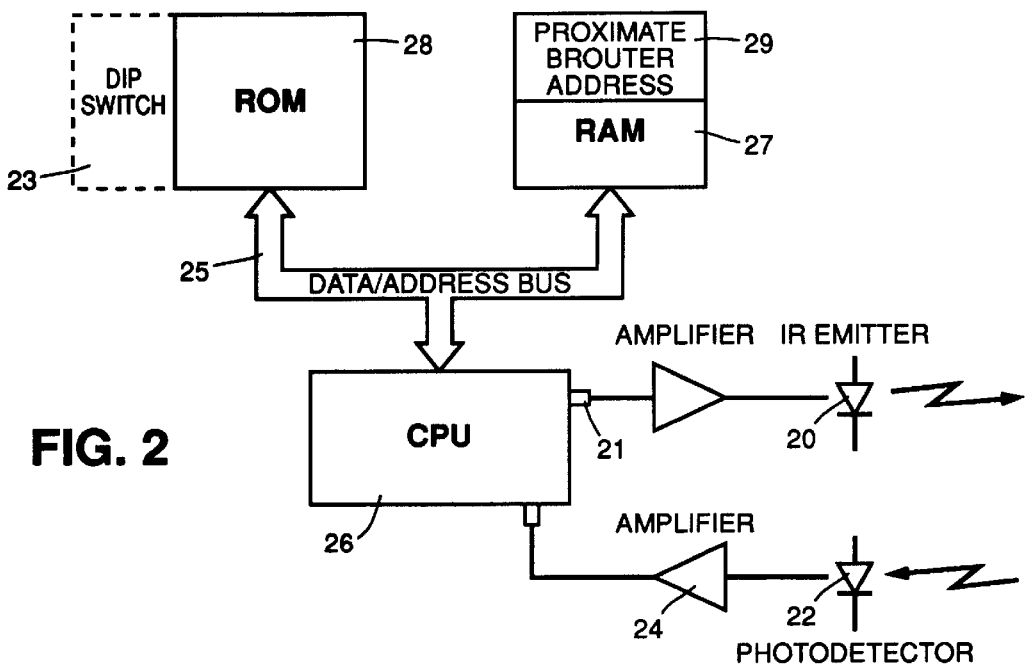
FIG. 2 is a schematic diagram of a remote control device for use with a local area network in accordance with the present invention.

FIG. 2 provides an illustration of the basic components of a remote control device which may be used in the present invention. The bidirectional IR remote control device illustrated therein includes both a transmitter, or IR emitter, 20 and a photodetector, 22. Transmissions detected by photodetector 22 are provided through amplifier 24 to the central processing unit (CPU) 26. Packets containing proximate brouter address updates, transmitted from the proximate brouter to the remote control device are provided to the appropriate memory location, read-only memory (ROM) 28 or random access memory (RAM) 27, along data/address bus 25. As noted above, the proximate brouter address should be provided to a readable/writable memory location, herein RAM 27, to allow for the necessary dynamic updates. Memory location 29 is schematically illustrated as the location in RAM 27 at which the proximate brouter address is stored. The memory location may be a register, table or other storage location which is designated by the CPU for storage of the proximate network brouter address. Information such as the broadcast address for the network, the source address of the remote control device, network destination unit addresses, and function signal format information (e.g., for generating a "increase volume" message upon signalling from a depressed button on the remote control keypad) can be provided to read only memory, 28, possibly by the setting of DIP switches, at 23, at initialization of the remote control, or may also be provided to a designated RAM location. Software in the CPU will direct packets containing the various addresses for storage in the appropriate locations. When a message is to be generated at the remote control device, the CPU accesses the proximate brouter address from storage location 29 and the destination unit address, the source address, and the message signal format information from their respective memory locations, and assembles the packet in the standard packet format. The assembled packet is then queued at output port 21 for transmission to the proximate network brouter via IR emitter 20.

As discussed above, the remote control device may additionally be provided with a function key for querying the proximate brouter for its address. In such an embodiment (not shown), depression of a query function key will activate the CPU to assemble, queue and transmit a broadcast packet containing an address packet request in the message section of the packet. The CPU's software will automatically perform this function when the assigned key is depressed. Alternatively, the query function could be conducted attendant to every use of the remote control device, as mentioned above, with the CPU handling the query-update-generate packet-transmit process flow each time a button on the remote control device keypad is depressed.

Figure 3:
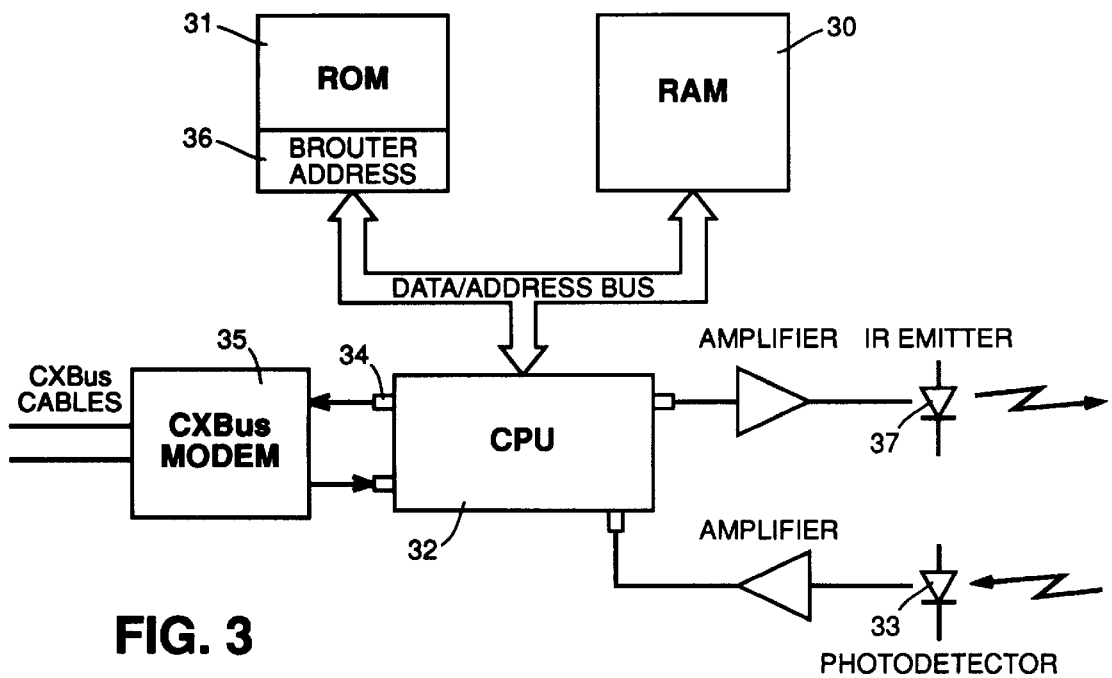
FIG. 3 is a schematic diagram of a brouter for use in a local area network in accordance with the present invention.

A bidirectional brouter for use in the inventive system is illustrated in FIG. 3. The brouter includes at least one memory location, in RAM 30, at which the addresses of units on the network are maintained. As noted above, the memory location may be a sequential register or table into which addresses are automatically sequentially entered as packets having those addresses arrive at the brouter. The brouter may also have at least one memory location, ROM 31, for storage of information which will not and cannot be altered, such as the brouter's unique address, schematically illustrated at ROM memory location 36. Entries to the memory locations are monitored by CPU 32, as are the transfers of network messages from the IRBus to the CXBus and vice versa. Packets received by the brouter via photodetector 33 are provided to CPU 32 for processing. If the packet is a message packet intended for a network component, the CPU queues the packet at output port 34 for transmission via CXBus modem 35. As mentioned above, the brouter may also be connected to a different wired medium, other than the illustrated CXBus, and would include a modem for the appropriate transmission along the medium to which it is connected. If the packet provided to the CPU includes a request for address information from a proximate remote control device, the brouter will access its brouter address, for example from ROM location 36, and assemble a packet for transmission to the remote control device via IR emitter 37. CPU 32 will have resident software for responding to a request for address information by assembling and transmitting the appropriate packet. In the alternative embodiment, in which the brouter automatically periodically transmits its address, the CPU is equipped with software to effect the automatic generation and transmission of address packets at preset intervals in response to signalling by the CPU's clock means (not shown). Since the address packet is a broadcast packet, it may be possible to circumvent the requirement that the packet be assembled each time a transmission is scheduled. Rather, a preassembled packet may be periodically retrieved from a memory location and transmitted upon signalling from the clock means.

A further embodiment of the present invention is the automatic updating of system configuration information to the brouters or routers and through the brouters and routers to associated electronic units and components. If the network includes a network controller, the network controller can, either periodically or upon the occurrence of one of a number of precipitating events, broadcast system configuration information along the various media of the network. Routers and brouters will update their tables and provide switching of the broadcast packets between the connected media. Specifically, the brouters will re-broadcast the message to the electronic units along the wireless or wired media and the routers will rebroadcast along the wired media for updating of network system configuration data stored therein. Such dynamic downloading and updating of network configuration information facilitates the functioning of the local area network not only when the network is reconfigured (one or more units moved) or when the remote control device is moved, but also when the system has been subjected to a power outage causing loss of the system data or the remote control has had a power (battery) failure causing loss of the information stored in the remote tables and registers. Beyond the replacement of lost table entries, the remote control device can additionally be programmed automatically by the downloading of information from the network controller via the network brouter. As with the brouter address information, the network system information may be requested of the network controller by the remote control device via a message broadcast to the network through the proximate brouter, said message including both the proximate network brouter address and the network controller address in the [destination address] portion of the packet.

While the invention has been described with specific reference to preferred embodiments, it is not intended that the invention be limited to the exact network and component configurations schematically illustrated herein, nor to the implementation of the invention for only CEBus networks, brouters and remote control devices. Clearly, one may modify the network and components thereof without departing from the spirit and scope of the invention as defined in the claims appended hereto.

What is claimed is:

1. A local area packet-switched network for communication of information and control signals between remotely controllable, addressable electronic units of said network, said electronic units being interconnected in said network through a first transmission medium, said network adapted to route signals received from a remote control unit through a second, wireless transmission medium to at least one of said electronic units, said received signals containing information for permitting said network to route said received signals to at least one of said electronic units, said network comprising:

at least one brouter for receiving signals from a remote control unit through said second, wireless transmission medium and for routing said received signals to at least one of said electronic units through said first transmission medium, said brouter including means for automatically, periodically, and not in response to a polling signal, transmitting an asynchronous brouter address signal through said second, wireless transmission medium, said brouter address signal containing a brouter address used by a remote control unit in transmitting a signal to said network through said brouter.

2. A local area packet-switched network for communication of information and control signals between remotely controllable, addressable electronic units of said network, said electronic units being interconnected in said network through a first transmission medium, said network adapted to route signals received from a remote control unit through a second, wireless transmission medium to at least one of said electronic units, said received signals containing information for permitting said network to route said received signals to at least one of said electronic units, said network further adapted to receive signals from said remote control unit regardless of a change in location of said remote control unit, said network comprising:

at least one brouter for receiving signals from a remote control unit through said second, wireless transmission medium and for routing said received signals to at least one of said electronic units through said first transmission medium, said brouter including means for automatically, periodically, and not in response to a polling signal, transmitting an asynchronous brouter address signal through said second wireless transmission medium, said brouter address signal containing a brouter address used by a remote control unit in transmitting a signal to said network through said brouter, thereby permitting a remote control unit moved into the vicinity of said brouter to transmit a signal to said network.

3. The network of claim 2, further including at least one remote control unit adapted to transmit, through said second, wireless transmission medium, a signal addressed to at least one of said electronic units.

4. The network of claim 3 wherein said at least one remote control unit further comprises means for receiving signals transmitted by said at least one brouter.

5. The network of claim 4 wherein said remote control unit further comprises brouter address storage means for automatically storing a brouter address contained in an address signal received from said brouter.

6. The network of claim 5 wherein said remote control unit further comprises:

means for generating a brouter address request packet for requesting a brouter address for communicating to said network through said brouter; and means for generating a brouter address request packet in response to user input on said remote control unit.

7. The network of claim 6 wherein said brouter additionally comprises means for automatically transmitting a brouter address signal in response to receiving a brouter address request packet.

8. The network of claim 6 wherein each of said electronic units is associated with a network address and wherein said brouter includes at least one brouter storage location for storing at least one of said network addresses.

9. The network of claim 8 wherein said brouter further automatically transmits a signal on said second, wireless transmission medium, said signal comprising the contents of said at least one brouter storage location.

10. The network of claim 9 wherein said at least one remote control unit further comprises network address storage means for storing at least one network address and for automatically updating said at least one stored network address in response to receipt of said signal comprising the contents of said at least one brouter storage location.

11. A brouter for connection in a local area packet-switched network of remotely controllable, addressable electronic units interconnected through a first transmission medium, said brouter routing information and control signals between a first transmission medium and a second, wireless transmission medium, said brouter being addressable through said first and said second, wireless transmission media through a brouter address associated with said brouter, said brouter further adapted to receive signals through said second wireless transmission medium from a remote control unit located in the vicinity of said brouter for permitting said remote control unit to transmit a signal to at least one of said electronic units, said brouter comprising:

a central processing unit for processing signals originating from and received by said brouter, and for automatically, periodically, and not in response to a polling signal, generating an asynchronous brouter address signal for transmission on said first and said second, wireless transmission media to said electronic units and to said remote control unit, said brouter address signal containing a brouter address for use by at least one of said electronic units and by said remote control unit in transmitting a signal to at least one of said electronic units through a network connection provided by said brouter;

a first transmitter for transmitting signals on said first transmission medium to said electronic units;

a first receiver for coupling signals received through said first transmission medium to said central processing unit;

a second transmitter for transmitting signals on said second wireless transmission medium to at least one remote control unit; and a second receiver for coupling signals received through said second, wireless transmission medium to said central processing unit.

12. The brouter of claim 11 wherein said central processing unit further includes means for generating a network information signal including said brouter address for transmission to at least one of said electronic units in response to a request signal received over said first transmission medium.

13. A router for connection in a local area packet-switched network of remotely controllable, addressable electronic units interconnected through a transmission medium for transferring information and control signals through said transmission medium, said router being addressable through said transmission medium through a router address associated with said router, said router routing information and control signals between said electronic units, said router comprising:

a central processing unit for processing signals originating from and received by said router and for automatically, periodically, and not in response to a polling signal, generating an asynchronous router address signal for transmission on said transmission medium to said electronic units, said router address signal containing a router address for use by at least one of said electronic units in transmitting a signal to at least one other of said electronic units through said router;

a transmitter for transmitting signals on said transmission medium to said electronic units; and a receiver for coupling signals received through said transmission medium to said central processing unit.

14. The router of claim 13 wherein said central processing unit further includes means for generating a network information signal including said router address for transmission to at least one of said electronic units in response to a request signal received over said first transmission medium.

15. A method for use in a local area packet-switched network of remotely controllable, addressable electronic units interconnected through a first transmission medium, said network having a brouter connected to at least one of said electronic units for routing signals received through a second, wireless transmission medium to said network, said method providing network information including a brouter address to a remote control unit proximate to said brouter, said network information for use by said remote control unit in transmitting a signal over said second, wireless transmission medium to said brouter for transmission to at least one of said electronic units, said remote control unit including a network information storage location for storing received network information including said brouter address, comprising the steps of:

periodically, automatically, and not in response to a polling signal, transmitting asynchronous network information signals including said brouter address over said second, wireless transmission medium;

receiving said network information signals at said remote control unit;

automatically storing information contained in said received network information signal in a network information storage location provided in said remote control unit; and using said stored network information by said remote control unit to transmit a signal to said brouter for receipt by at least one of said electronic units.

16. The method of claim 15 wherein said network information further comprises at least one network address associated with an addressable electronic unit for permitting said remote control unit to transmit a signal to the electronic unit associated with said network address.

* * * * *